(12) United States Patent
Bracha et al.

(10) Patent No.: US 10,075,380 B2
(45) Date of Patent: Sep. 11, 2018

(54) PROBABILISTIC METERING

(71) Applicant: Avago Technologies General IP (Singapore) Pte. Ltd., Singapore (SG)

(72) Inventors: Gabi Bracha, Tel-Aviv (IL); Golan Schzukin, Ness Ziona (IL); Ariel Shchigelski, Herzliya (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 36 days.

(21) Appl. No.: 15/412,688

(22) Filed: Jan. 23, 2017

(65) Prior Publication Data

US 2018/0212884 A1  Jul. 26, 2018

(51) Int. Cl.
*H04L 12/813* (2013.01)
*H04L 12/819* (2013.01)

(52) U.S. Cl.
CPC ............ *H04L 47/20* (2013.01); *H04L 47/215* (2013.01)

(58) Field of Classification Search
CPC ............................ H04L 47/20; H04L 47/215
USPC ....................................................... 370/235.1
See application file for complete search history.

(56) References Cited

U.S. PATENT DOCUMENTS

| | | | | |
|---|---|---|---|---|
| 6,950,395 B1* | 9/2005 | Bashandy | ........... | H04L 12/5602 370/230.1 |
| 7,277,388 B1* | 10/2007 | Koodli | .................... | H04L 47/10 370/230.1 |
| 7,307,949 B1* | 12/2007 | Washburn | ............... | H04L 47/10 370/230 |
| 7,366,098 B1* | 4/2008 | Rangarjan | ............... | H04L 47/10 370/230 |
| 7,623,452 B2* | 11/2009 | Roeder | .................... | H04L 47/10 370/230.1 |
| 7,965,638 B1* | 6/2011 | Schzukin | ................ | H04L 47/10 370/229 |
| 8,059,559 B2* | 11/2011 | Bugenhagen | ........... | H04L 43/00 370/253 |
| 8,068,460 B2* | 11/2011 | Fajardo | ............. | H04W 36/0011 370/331 |
| 8,151,019 B1* | 4/2012 | Le | ........................... | G06F 5/065 710/15 |
| 8,300,575 B2* | 10/2012 | Willars | ................... | H04L 47/10 370/328 |

(Continued)

*Primary Examiner* — Stephen J Clawson
(74) *Attorney, Agent, or Firm* — Sterne, Kessler, Goldstein & Fox P.L.L.C.

(57) ABSTRACT

A service provider or operator of a network often requires the ability to control the amount of data that flows can send and/or receive over a network such that a flow receives at least a predetermined, minimum amount of upstream and/or downstream bandwidth and can potentially utilize excess upstream and/or downstream bandwidth above the minimum amount when available. The present disclosure provides a method and apparatus for implementing a control scheme capable of achieving these and other objectives in a network. In general, the method and apparatus probabilistically meter packets to be sent upstream and/or downstream to determine whether they are in conformance with a service agreement (and at what level of conformance). By using probabilistic metering, smaller width counters can be used to perform the metering over conventional implementations, which reduces power demands and chip space demands.

20 Claims, 7 Drawing Sheets

(56) References Cited

U.S. PATENT DOCUMENTS

| | | | | |
|---|---|---|---|---|
| 8,416,689 | B2* | 4/2013 | Davari | H04L 47/10 370/232 |
| 8,964,538 | B2* | 2/2015 | Kramer | H04L 47/20 370/230 |
| 2006/0018316 | A1* | 1/2006 | Ehara | H04L 47/10 370/389 |
| 2006/0187827 | A1* | 8/2006 | Smith | H04L 47/10 370/229 |
| 2007/0263535 | A1* | 11/2007 | Shabtay | H04L 12/66 370/230 |
| 2008/0025214 | A1* | 1/2008 | Bettink | H04L 47/10 370/230 |
| 2008/0279207 | A1* | 11/2008 | Jones | H04L 47/20 370/412 |
| 2011/0235509 | A1* | 9/2011 | Szymanski | H04L 47/14 370/230 |
| 2012/0047279 | A1* | 2/2012 | Zhu | H04L 47/11 709/231 |
| 2013/0039178 | A1* | 2/2013 | Chen | H04L 47/22 370/230.1 |

* cited by examiner

PROBABILISTIC METERING

TECHNICAL FIELD

This application relates generally to metering of packets. More particularly, this application relates to probabilistic metering of packets.

BACKGROUND

A service provider or operator of a network often desires the ability to control the amount of data that a flow can send and/or receive over a network such that the flow receives at least a predetermined, minimum amount of upstream and/or downstream bandwidth and, potentially, can utilize excess upstream and/or downstream bandwidth above the minimum amount when available. Control schemes exist for achieving these objectives. The control schemes meter packets of the flow to be sent upstream and/or downstream to determine whether they are in conformance with a service agreement (and at what level of conformance with the service agreement) and drop those packets to be sent upstream and/or downstream that are not in conformance.

Typically, these control schemes use two or more counters for each flow sending and/or receiving data over the network that is to be metered, where a flow is a broad term that can include, for example, packets of data from one or more subscribers and/or from one or more subscriber applications running on devices. In some instances, a large number of flows and their respective data are desired to be metered, which requires a large number of counters that consume power and chip space in an integrated circuit implementation.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
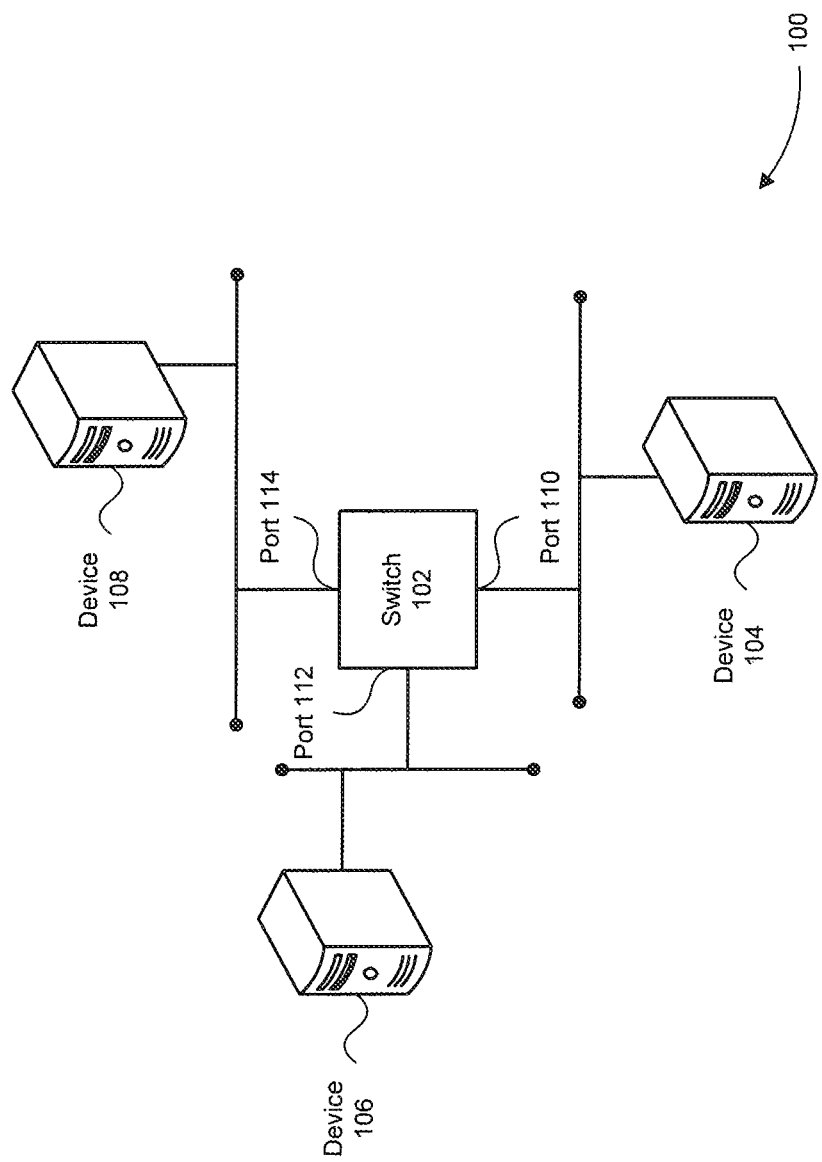
FIG. 1 illustrates an exemplary network according to embodiments of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, a block shown in one of the accompanying drawings illustrating a block diagram shall be understood to include software, firmware, hardware (such as one or more circuits, special purpose processors, and/or general purpose processors), or any combination thereof. In addition, each block shown in one of the accompanying drawings can include one or more components within an actual device, and each component that forms a part of the described block can, function either cooperatively or independently of any other component forming a part of the block. Conversely, multiple blocks described herein can represent a single component within an actual device. Further, components within a block can be in a single device or distributed among multiple devices and can communicate in a wired or wireless manner.

As discussed above, a service provider or operator of a network often requires the ability to control the amount of data that flows can send and/or receive over a network such that a flow receives at least a predetermined, minimum amount of upstream and/or downstream bandwidth and, potentially, can utilize excess upstream and/or downstream bandwidth above the minimum amount when available. Described below is a method and apparatus for implementing a control scheme capable of achieving these and other objectives in a network.

In general, the method and apparatus of the present disclosure probabilistically meter packets of a flow to be sent upstream and/or downstream to determine whether they are in conformance with a service agreement (and at what level of conformance with the service agreement). By using probabilistic metering, smaller width counters can be used to perform the metering over conventional implementations, which reduces power demands and chip space demands in an integrated circuit implementation.

The apparatus and method of the present disclosure can be implemented in many types of devices, including network switches configured to perform metering. Many computer networks utilize a switch to connect devices together so that packets (e.g., frames or, more generally, messages) can be forwarded between devices on the network and for other purposes. Unlike a hub, a switch does not simply flood an incoming packet received from one device out each of its ports to all other devices. Rather, switches transmit an incoming packet only out the port connected to the receiving, device in which the packet was addressed, assuming such port is known. This helps to reduce unnecessary traffic on the network.

To further describe the functionality of a switch, FIG. 1 illustrates an exemplary network portion 100 (e.g., a portion of a local area network or a metropolitan area network) in accordance with embodiments of the present disclosure. As shown in FIG. 1, network portion 100 includes a switch 102 that connects devices 104, 106, and 108 through respective ports 110, 112, and 114. Devices 104-108 can be, for example, other network switches, routers, desktop computers, laptops, tablets, etc. If switch 102 knows that device 104 is coupled to port 110, it can intelligently forward packets addressed to device 104 out port 110 without sending the packets to ports 112 and 114. For example, if device 106 sends a packet to device 104, switch 102 can forward the packet only to port 110 and not port 114 so that device 108 would not receive the packet.

To accomplish this intelligent forwarding operation, switch 102 can continually learn about its environment. Devices can not only join and leave network portion 100, but they can also potentially move between ports on switch 102. Switch 102 can keep track of the devices coupled to its ports by examining each incoming packet for a media access control (MAC) address or some other address that identifies the source device of the packet and then associating the address with the port over which the packet is received in a forwarding table.

For example, assume device 104 transmits a packet intended for reception by device 108. Switch 102 would receive the packet from device 104 through port 110. Switch 102 would then take the opportunity, before forwarding the packet to device 108, to update its forwarding table by examining the incoming packet for the address identifying the source device from, which the packet was sent. In this instance, switch 102, after examining the incoming packet, would update its forwarding table to associate the address of device 104 with port 110. Using the updated forwarding table, switch 102 can then forward incoming packets that are intended for receipt by device 104 only out port 110, rather than flooding these packets out each of its ports, to reduce the amount of traffic on network portion 100.

It should be noted that switch 102 is provided for exemplary purposes only and that other switches and variations on switch 102 can implement embodiments of the apparatus and method of the present disclosure. For example, switch 102 can have many more ports and devices coupled to it than shown in FIG. 1.

Figure 2:
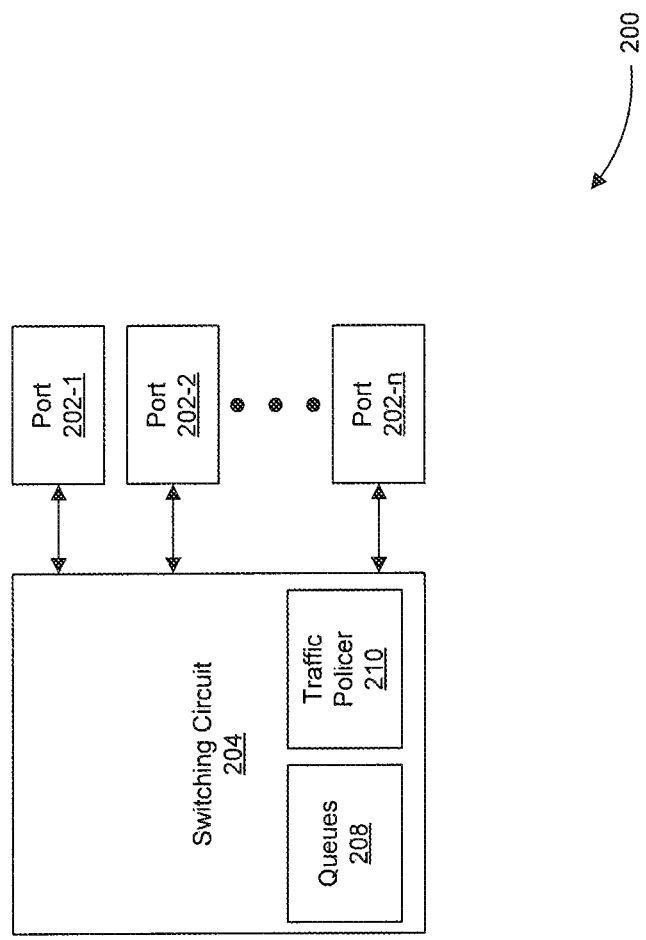
FIG. 2 illustrates an exemplary block diagram of a network switch according to embodiments of the present disclosure.

FIG. 2 illustrates an exemplary block diagram of a network switch 200 in accordance with embodiments of the present disclosure. Switch 200 includes a plurality of ports 202-1 through 202-$n$ and a switching circuit 204. Switching circuit 204 includes queues 208 and a traffic policer 210. Switch 200 can be an exemplary embodiment of switch 102 that is shown in FIG. 1.

In operation, packets of data associated with a flow are received by switch 200 over one or more of ports 202-1 through 202-$n$, where a flow is a broad term that can include, for example, packets of data from one or more subscribers and/or from one or more subscriber applications running on devices of the network in which switch 200 is implemented. The received packets are provided from the one or more ports 202-1 through 202-$n$ to switching circuit 204 to perform the basic operation of a switch as described above in regard to FIG. 1.

Additionally, the packets provided to switching circuit 204 are processed by traffic policer 210. Traffic policer 210 is configured to probabilistically meter the packets associated with the flow to determine whether they are in conformance with a service agreement. If a packet is in conformance with the service agreement, the packet is marked with its level of conformance and, optionally, stored in one or more of queues 208 (e.g. memory) for later transmission via one or more of ports 202-1 through 202-$n$. However, if the packet is not in conformance with the service agreement, the packet can be dropped by traffic policer 210 and not buffered by queues 208 for later transmission. It should be noted that traffic policer 210 can also perform traditional, non-probabilistic metering of packets.

In one embodiment, traffic policer 210 determines whether a packet is in conformance with the service agreement using four values: the committed information rate (CIR), the committed burst size (CBS), the peak information rate (PIR), and the peak burst size (PBS). The CIR is the upstream and/or downstream data rate guaranteed by the service provider or operator of the network to the flow. In general, the upstream and/or downstream traffic of the flow received by switch 200 at a rate less than or equal to the CIR will be transmitted by switch 200 with a high probability. The PIR is the maximum upstream and/or downstream data rate the service provider or operator of the network will provide to the flow. Upstream and/or downstream traffic of the flow that is in excess of the CIR but is less than the PIR is eligible, but not guaranteed, to be transmitted by switch 200. For example, if the current utilization of the network in which switch 200 is implemented can handle extra load to and/or from the flow, while still providing for all other committed traffic, the service provider or operator of the network may allow switch 200 to transmit data at a rate higher than the CIR but less than the PIR for the flow.

Although these two rates, CIR and PIR, can be used to provide a predetermined minimum and maximum amount of upstream and/or downstream bandwidth to a flow, they do not provide, by themselves, adequate support for the potential bursty nature of upstream and/or downstream flow traffic. The CBS and the PBS provide this additional support. These two values and the entire metering process in general, can be best understood with further reference to FIG. 3.

Figure 3:
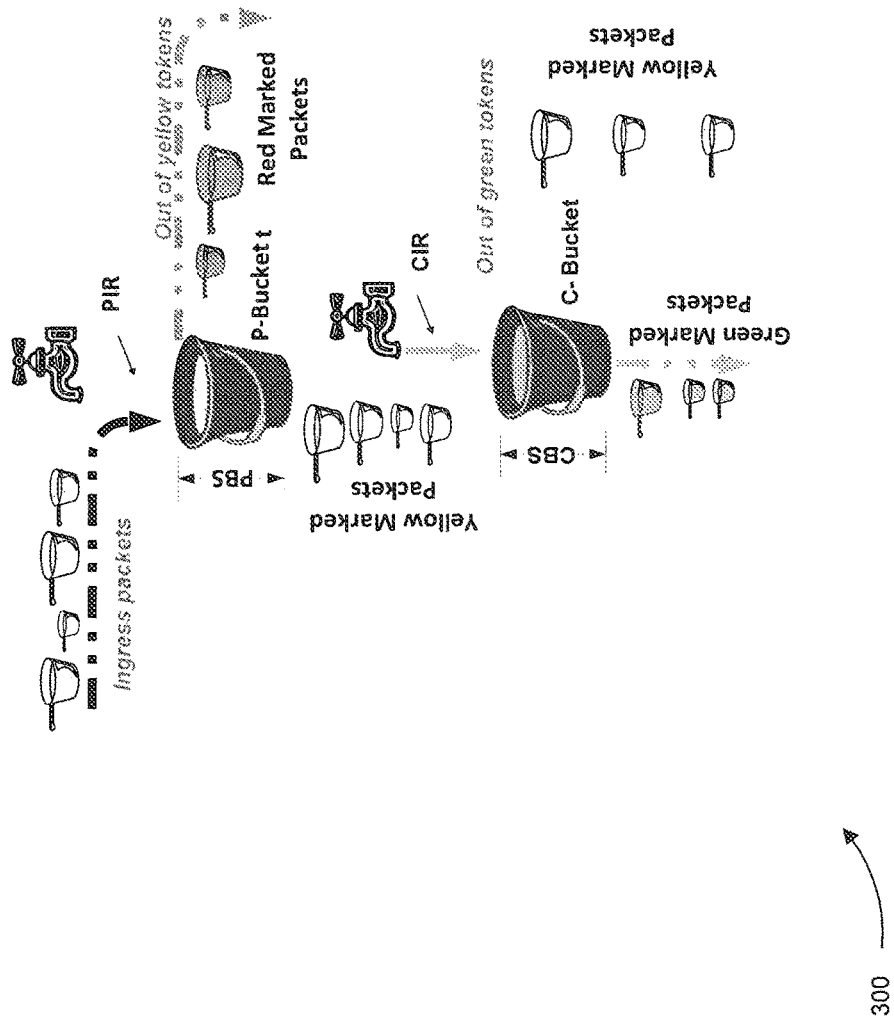
FIG. 3 illustrates a model of an exemplary, non-probabilistic metering process according to embodiments of the present disclosure.

FIG. 3 illustrates a model 300 of an exemplary, non-probabilistic metering process that can be implemented by traffic policer 210 and how the four values, CIR, PIR, CBS, and PBS, come in to play within this process. As illustrated in FIG. 3, there are two "buckets," each of which can be implemented as a counter in hardware. The first bucket is the peak bucket, or p-bucket, and the second bucket is the committed bucket, or c-bucket. These two buckets are configured to "retain" tokens, each of which confers at least the potential to transmit a byte of information (or some other amount of information) upstream and/or downstream over the network. Assuming these two buckets are actually implemented using counters, the count value can reflect the number of tokens currently retained by the bucket.

The p-bucket is replenished with tokens at the PIR and can store a maximum number of tokens specified by the PBS. As upstream and/or downstream packets of data come into traffic policer 210 for a flow, each packet is marked with either a yellow marker or a red marker. A packet is marked yellow if there is at least one token in the p-bucket for every byte of information in the packet (assuming each token confers at least the potential to transfer one byte of information) and, once marked, those tokens covering the packet are removed from the p-bucket. A yellow marked packet indicates that the packet's current level of conformance is above the CIR, but at or below the PIR, and is therefore eligible, but not guaranteed, to be transmitted upstream or downstream. If, on the other hand, the p-bucket currently does not have enough tokens to cover the packet, the packet is marked red and no tokens are removed from the p-bucket. A red marked packet indicates that the packet's current level of conformance is above the PIR and should be discarded.

After this initial marking is performed, all yellow marked packets are further metered by the c-bucket. The c-bucket is replenished with tokens at the CIR and can store a maximum number of tokens specified by the CBS. As yellow marked packets of data come in, each is either left as yellow, or remarked as green. A packet is marked green if there is at least one token in the c-bucket for every byte of information in the packet (assuming each token confers the right to transfer one byte of information) and, once marked, those tokens covering the packet are removed from the c-bucket. A green marked packet indicates that the packet's current level of conformance is at or below the CIR and is guaranteed to be transmitted upstream or downstream with a high probability. If, on the other hand, the c-bucket currently does not have enough tokens to cover the packet, the packet is left as yellow.

Figure 4:
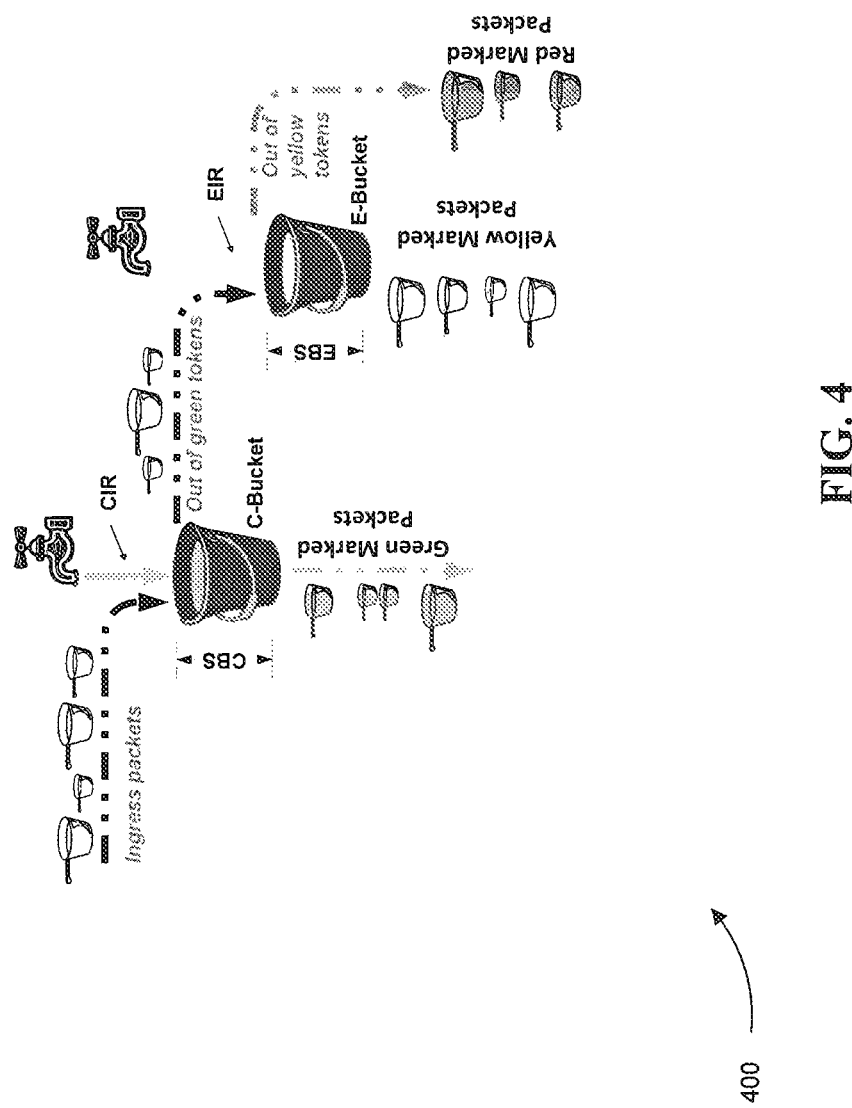
FIG. 4 illustrates another model of an exemplary, non-probabilistic metering process according to embodiments of the present disclosure.

FIG. 4 illustrates another model 400 of an exemplary, non-probabilistic metering process that can be implemented by traffic policer 210. Instead of using the four values, CIR, PIR, CBS, and PBS, model 400 uses two new values in place of the PIR and PBS values. These two new values are the excess information rate (EIR) and the excess burst size (EBS). In general, the EIR is simply the difference between the PIR and the CIR, and the EBS is simply the difference between the PBS and the CBS.

As illustrated in FIG. 4, there are again "two buckets," which can be implemented as counters in hardware. The first bucket is the committed bucket, or c-bucket, which was described above, and the second bucket is the excess bucket, or e-bucket. These two buckets are configured to "retain" tokens, each of which confers at least the potential to transmit a byte of information (or some other amount of information) upstream or downstream over the network. Assuming these two buckets are actually implemented using counters, the count value can reflect the number of tokens currently retained by the bucket.

The c-bucket is replenished with tokens at the CIR and can store a maximum number of tokens specified by the CBS. As upstream and/or downstream packets of data come into traffic policer 210 for a flow, each packet is either marked with a green marker or is passed on to the e-bucket for further processing. A packet is marked green if there is at least one token in the c-bucket for every byte of information in the packet (assuming each token confers the right to transfer one byte of information) and, once marked, those tokens covering the packet are removed from the c-bucket. A green marked packet indicates that the packet's current level of conformance is at or below the CIR and is guaranteed to be transmitted upstream or downstream with a high probability. If, on the other hand, the c-bucket currently does not have enough tokens to cover the packet, the packet is left unmarked and is passed on to the e-bucket for further processing.

The e-bucket is replenished with tokens at the EIR and can store a maximum number of tokens specified by the EBS. As the packets of data come in, each is marked with a yellow marker or a red marker. A packet is marked yellow if there is at least one token in the e-bucket for every byte of information in the packet (assuming each token confers at least the potential to transfer one byte of information) and those tokens covering the packet are then removed from the e-bucket. A yellow marked packet indicates that the packet's current level of conformance is above the CIR, but at or below the PIR, and is therefore eligible, but not guaranteed, to be transmitted upstream or downstream. If, on the other hand, the e-bucket currently does not have enough tokens to cover the packet, the packet is marked red. A red marked packet indicates that the packet's current level of conformance is above the PIR and should be discarded.

The bucket counter width of non-probabilistic metering processes, such as those described above in regard to FIGS. 3 and 4, is typically proportional to the EIR, CIR, or PIR. Larger flows tend to have larger burst sizes. For example, one source of burstiness is the TCP protocol that is burst)/by its design. The amount of burst is typically related to the Round Trip Time (RTT) of the packet in the network from the flow source to its destination and back. A switch may need to support many meters (e.g. 100,000 meters) of small rate flows, at rates of a few megabits per second (Nibs), and on the other side a few very large aggregate flows in the range of 100 gigabits per second (Gbps). The simplistic and straightforward approach to such variability would be to set all meters' counters (e.g., all 100,000 meters' counters) to the largest possible size (width). However, such an approach has high costs in terms of power and die area in an integrated circuit implementation.

Therefore, traffic policer 210 can instead implement one or more probabilistic metering variants of the two metering processes described above in regard to FIGS. 3 and 4 or probabilistic metering variants of other metering processes as would be appreciated by one of ordinary skill in the art based on the teachings herein. As explained below, probabilistic metering allows the width (in terms of bits) of the bucket counters used to be reduced (thus saving power and die area) without a large loss in the accuracy at which a flow's packets are metered.

For example, in the above described non-probabilistic metering processes in FIGS. 3 and 4, each increment of the bucket counter conferred at least the potential to transmit one byte of information. In other words, the step size of the bucket counter was equal to one byte. Using probabilistic metering, the step size of the bucket counters can be increased to reduce the required width of the bucket counters. For example, instead of a step size that confers one byte of bandwidth, the bucket counters can use a step size, 64 bytes, or 128 bytes to provide a few examples. Because the burst size supported by the bucket (e.g., CBS or EBS) remains the same, the increased step size would reduce the required width (in terms of bits) of the bucket counter.

The problem that arises with using an increased step size for a bucket counter is decreased metering accuracy. For example, assume the increased step size of a bucket counter is 64 bytes and the bucket counter has a current count value of 10, which thus confers at least the potential to transmit 10*64 bytes (or 640 bytes) of data. If a packet with a size of 220 bytes is to be metered using the bucket counter, the packet can be marked as conforming with the bucket counter given that the current bucket count value is greater than 220 bytes. However, the bucket counter value cannot subsequently be decremented by exactly 220 bytes because each increment of the bucket counter is equal to 64 bytes. So a choice has to be made: either reduce the counter value by an increment of 3 equal to 3*64 bytes (or 192 bytes) or by an increment of 4 equal to 4*64 bytes (or 256 bytes). Either option introduces error or noise into the metering process. Thus, there can be a loss of metering accuracy with such an increased step size.

To help reduce this loss of metering accuracy, probability can be introduced into the metering process. For example, continuing with the above scenario, instead of attempting to reduce the bucket counter by the actual size of the packet (i.e., by 220 bytes), the bucket counter can be reduced by a probabilistic size of the packet. To determine a probabilistic size of the packet, the actual 220 byte size of the packet can first be divided by the step size of the bucket counter, which in the example scenario is again 64 bytes, to generate a quotient and a remainder. The quotient in this example would be 3 and the remainder would be 28.

The remainder can then be used to determine a probability distribution of the sample space {0, 1}, where the sample '1' is assigned a probability equal to the remainder divided by the step size of the bucket counter, and the sample '0' is assigned a probability equal to one minus the probability assigned to the sample '1'. Thus, for the scenario above, the sample '1' is assigned a probability of 28/64 and the sample '0' is assigned a probability of 1-28/64.

After assigning the probabilities to the sample space, a random value can be selected from the sample space in accordance with the probability distribution. The randomly selected value, which is either a '1' or '0', can then be added to the quotient to determine the amount by which the bucket counter is to be decremented for the packet. It can be shown that, over a large number of packets, this probabilistic manner of decrementing the counter can very accurately meter the packets.

Figure 5:
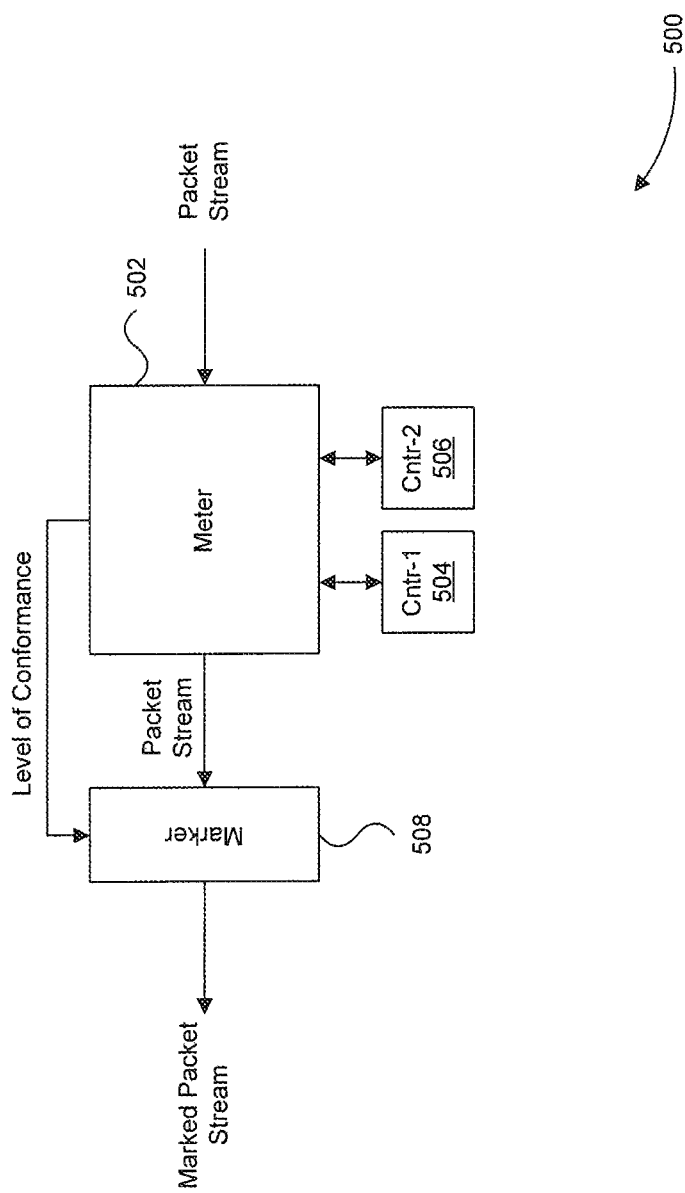
FIG. 5 illustrates a block diagram of an exemplary implementation of a traffic politer according to embodiments of the presented disclosure.

Referring now to FIG. 5, an example implementation of a traffic policer 500 is illustrated in accordance with embodiments of the present disclosure. Traffic policer 500 can be used to implement traffic policer 210 in FIG. 2, for example, or a traffic policer in another type of device. As shown in FIG. 5, traffic policer 500 includes a meter 502, at least two counters 504 and 506, and a marker 508.

In operation, meter 502 can be responsible for incrementing counters 504 and 506 at respective rates to perform packet metering. For example, meter 502 can increment counter 504 at a CIR and counter 506 at a EIR. Using these rates, counter 504 can be configured to reach a maximum counter value specified by a CBS and counter 506 can be configured to reach a maximum counter value specified by EBS. The step sizes of counters 504 and 506 can be set to a value that keeps their respective widths (in terms of bits) at or below some desired amount. For example, counters 504 and 506 can each have a step size of 64 bytes or 128 bytes, where the step size of a counter refers to the amount of data each increment of the counter confers to at least potentially transmit upstream and/or downstream.

Meter 502 can further be configured to receive a packet to be metered and determine the packet's probabilistic size as described above. Meter 502 can then compare the actual size or probabilistic size of the packet to be metered to the counter value of at least one of counters 504 and 506 to determine whether the packet is in conformance with the data rate associated with the counter (e.g., the CIR or the EIR). If the packet is determined to be in conformance, meter 502 can subsequently decrement the value of the counter by the probabilistic size of the packet and provide the level of conformance to marker 508 for appropriate marking of the packet.

Figure 6:
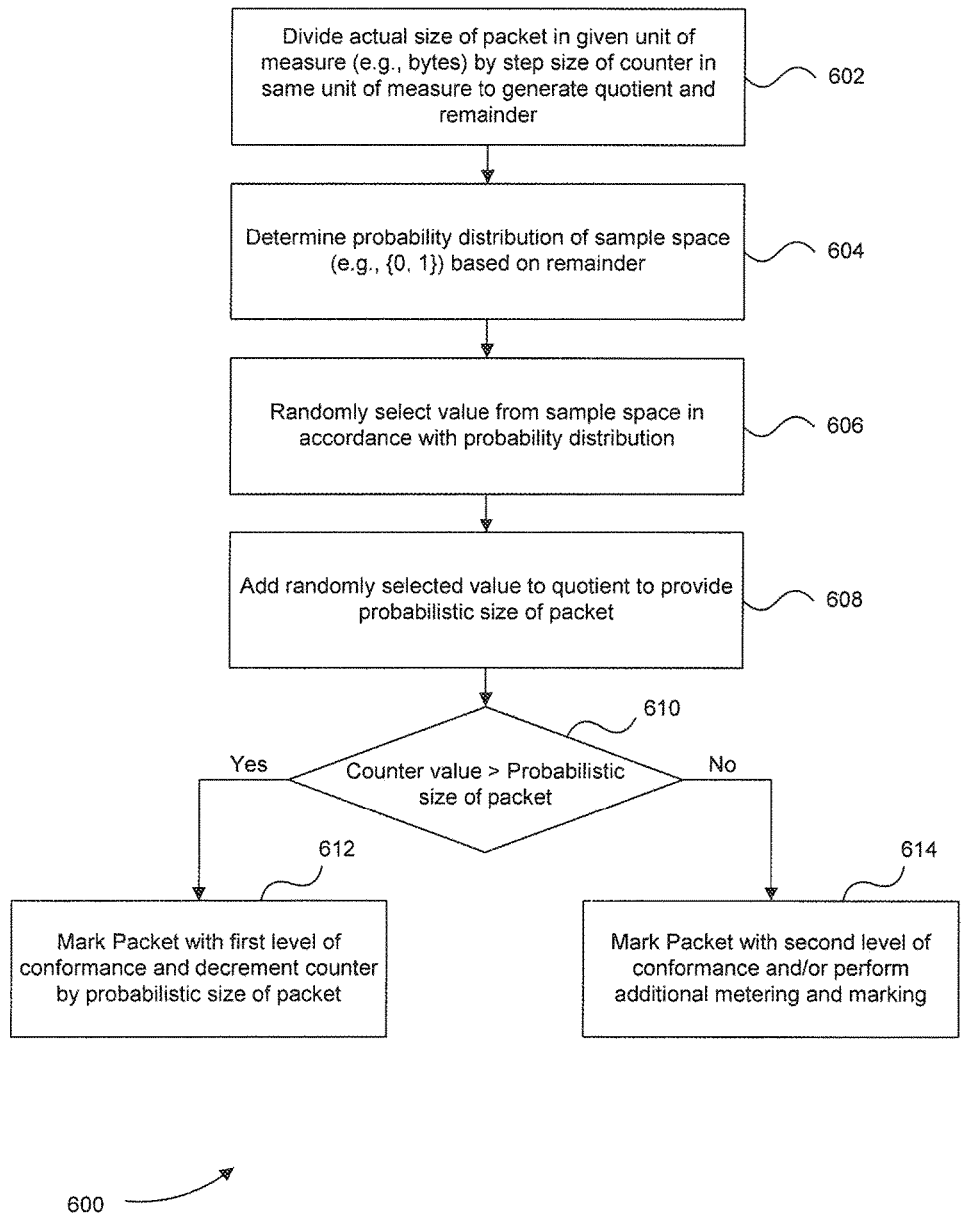
FIG. 6 illustrates a flowchart of a method for performing probabilistic metering according to embodiments of the present disclosure.

Referring now to FIG. 6, a flowchart 600 of a method for performing probabilistic metering is illustrated in accordance with embodiments of the present disclosure. The method of flowchart 600 can be implemented by traffic policer 502 in FIG. 5 or other traffic policers as would be appreciated by one of ordinary skill in the art based on the teachings herein. In addition, one or more of the steps shown in flowchart 600 can potentially be performed in a different order as would be appreciated by one of ordinary skill in the art.

The method of flowchart 600 begins at step 602. At step 602, the actual size of a packet to be metered in a given unit measure (e.g., bytes) is divided by the step size of the counter provided in the same unit of measure to generate a quotient and a remainder. The counter is used to perform metering as described above.

After step 602, the method of flowchart 600 proceeds to step 604. At step 604, a probability distribution for a sample space is determined based on the remainder. For example, for the sample space {0, 1}, the sample '1' can be assigned a probability equal to the remainder divided by the step size of the bucket counter and the sample '0' is assigned a probability equal to one minus the probability assigned to the sample '1'. It should be noted that other sample spaces can be used as would be appreciated by one of ordinary skill in the art.

After step 604, the method of flowchart 600 proceeds to step 606. At step 606, a random value is selected from the sample space in accordance with the determined probability distribution.

After step 606, the method of flowchart 600 proceeds to step 608. At step 608, the random value is added to the quotient determined at step 602 to determine or provide a probabilistic size of the packet.

After step 608, the method of flowchart 600 proceeds to step 610. At step 610 the counter value is compared to the probabilistic size of the packet or, alternatively, the actual size of the packet. If the counter value is greater than the probabilistic size of the packet or, when used as an alternative, the actual size of the packet, the method of flowchart 600 proceeds to step 612. On the other hand, if the counter value is not greater than the probabilistic size of the packet or, when used as an alternative, the actual size of the packet, the method of flowchart 600 proceeds to step 614.

Assuming that the method of flowchart proceeds to step 612, the packet is marked with a first level of conformance and the value of the counter is decremented by the probabilistic size of the packet. Otherwise, at step 614, the packet is marked with a second level of conformance and/or additional metering and marking is performed on the packet. The first level of conformance can be, for example, the color yellow in FIG. 3 or the color green in FIG. 4.

Figure 7:
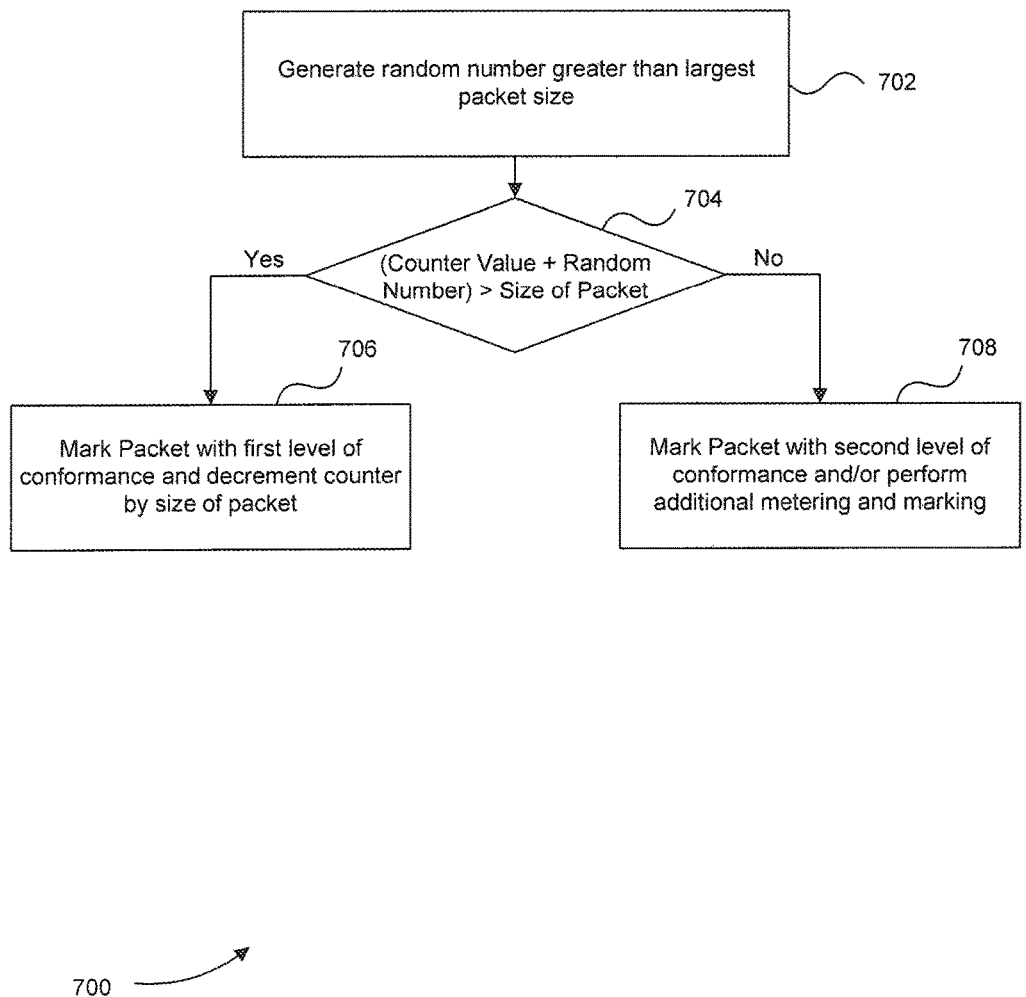
FIG. 7 illustrates a flowchart of a method for reducing potential unfairness between two or more packet flows being metered by the same meter according to embodiments of the presented disclosure.

Referring now to FIG. 7, a flowchart 700 of a method to reduce potential unfairness between two or more packet flows being metered by the same meter is illustrated in accordance with embodiments of the present disclosure. In general, when two packet flows are being metered by the same meter, unfairness can occur between the two packet flows based on the order in which packets from the two flows are received (i.e., how the packets from the two packet flows are interleaved) and/or based on the size of respective packets in the two packet flows (e.g., when one packet flow has large packets and the other packet flow has small packets).

For example, in the case where one flow has large packets ("large packet flow") and the other flow has small packets ("small packet flow"), if the rate at which the packets from the two flows are received is at the edge of the rate afforded by the meter, then there is a possibility that the packets of the small packet flow will largely be transmitted as conforming, while the packets of the large packet flow will largely be denied transmission. This is because the packets of the small packet flow will keep the token count of the meter below what is required to transmit many (if not all) of the packets of the large packet flow). In general, the unfairness results in packets of one flow being transmitted as conforming with the metering process to a larger degree than the packets of the other flow.

To remove or at least reduce these potentials for unfairness, the method of flowchart 700 can be performed by a traffic policer, such as traffic policer 500. As shown in FIG. 7, the method of flowchart 700 begins at step 702. At step 702, a random number is generated that is greater than the largest packet size to be metered by the traffic policer and less than some upper bound (e.g., 16 kilobytes).

After step 702, the method of flowchart 700 proceeds to step 704. At step 704, the counter value of the counter used to perform metering in the traffic policer is increased by adding the random number generated in step 702 to it. The resulting sum of the counter value and the random number are than compared to the size of a packet to be metered (e.g., an actual or probabilistic size of the packet to be metered).

Assuming the sum of the counter value and the random number are greater than the size of a packet to be metered, the method of flowchart 700 proceeds to step 706. At step 706, the packet is marked with a first level of conformance and the value of the counter is decremented by the size of the packet (either probabilistic or actual size). Otherwise, at step 708, the packet is marked with a second level of conformance and/or additional metering and marking is performed on the packet.

In general, the addition of the random number to the counter value before the comparison operation is performed at step 704 can be shown to help reduce the potential for unfairness as described above.

It should be noted that models 300 and 400 illustrated in FIGS. 3 and 4, respectively, can be expanded to include additional levels of conformance (i.e., more than the three levels of conformance described above), as would be appreciated by one of ordinary skill in the art. It should be further noted that the use of colors (and the specific color choices) as "markers" is an arbitrary choice and is used herein only for exemplary purposes. In general, the levels of conformance can be designated or referred to as being "marked" with any reasonable type of marker as would be further appreciated by one of ordinary skill in the art.

In addition, although the green marker type was described above as being used to indicate packets that are guaranteed to be transmitted upstream with a high probability, the yellow marker type was described above as being used to indicate packets that are eligible but not guaranteed to be transmitted upstream, and the red marker type was described above as being used to indicate packets that are not to be transmitted upstream, other broader, alternative indications for these marker types are possible. For example, each marker type can represent a level of effort or priority that will be applied by the network to transmit a packet upstream and/or downstream. In this example, the green marker type can indicate the highest level of effort or priority that will be applied by the network to transmit a packet upstream and/or downstream, the yellow marker type can indicate the second highest level of effort or priority that will be applied by the network to transmit a packet upstream and/or downstream, and the red marker type can indicate the lowest level of effort or priority that will be applied by the network to transmit a packet upstream and/or downstream.

It should be further noted that, rather than marking packets with their level of conformance, packets can simply be classified according to their level of conformance, as would be appreciated by one of ordinary skill in the art. In this instance, traffic politer 210 can be replaced with a classifier.

It will be appreciated that the above described embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for metering a packet of a packet stream, comprising:
    incrementing a count value of a counter based on a given rate;
    dividing an actual size of the packet by a step size of the counter to determine a quotient and a remainder;
    adding a random value to the quotient to provide a probabilistic size of the packet, wherein the random value is selected from a sample space with a probability distribution determined based on the remainder;
    marking the packet with a level of conformance based on a comparison of the counter value to the probabilistic size of the packet or the actual size of the packet; and
    decrementing the counter by the probabilistic size of the packet.

2. The method of claim 1, wherein the actual size of the packet and the step size of the counter are given in terms of bytes.

3. The method of claim 1, wherein the predetermined rate is a committed information rate, peak information rate, or an excess information rate.

4. The method of claim 1, wherein the sample space is {0, 1}.

5. The method of claim 4, wherein the probability distribution assigns a probability of selecting the sample value '1' from the sample space equal to the remainder divided by the step size of the counter.

6. The method of claim 1, wherein the probabilistic size of the packet is greater than the actual size of the packet.

7. The method of claim 1, further comprising:
adding a random number to the counter value before comparing the counter value to one of the actual size of the packet or the probabilistic size of the packet.

8. The method of claim 7, wherein the random number is generated to be larger than a largest size of packets in the packet stream.

9. A traffic policer for metering a packet of a packet stream, comprising:
a counter configured to increment a count value based on a given rate;
a meter configured to divide an actual size of the packet by a step size of the counter to determine a quotient and a remainder, add a random value to the quotient to provide a probabilistic size of the packet, and decrement the counter by the probabilistic size of the packet; and
a marker configured to mark the packet with a level of conformance based on a comparison of the counter value to the probabilistic size of the packet or the actual size of the packet,
wherein the random value is selected from a sample space with a probability distribution determined based on the remainder.

10. The traffic policer of claim 9, wherein the actual size of the packet and the step size of the counter are given in terms of bytes.

11. The traffic policer of claim 9, wherein the given rate is a committed information rate, peak information rate, or an excess information rate.

12. The traffic policer of claim 9, wherein the sample space is {0, 1}.

13. The traffic policer of claim 12, wherein the probability distribution assigns a probability of selecting the sample value '1' from the sample space equal to the remainder divided by the step size of the counter.

14. The traffic policer of claim 9, wherein the probabilistic size of the packet is greater than the actual size of the packet.

15. The traffic policer of claim 9, wherein the traffic policer is implemented in a network switch.

16. The traffic policer of claim 9, wherein the meter is further configured to add a random number to the counter value before comparing the counter value to one of the actual size of the packet or the probabilistic size of the packet.

17. The traffic policer of claim 16, wherein the random number is generated to be larger than a largest size of packets in the packet stream.

18. A method for metering a packet of a packet stream, comprising:
incrementing a count value of a counter based on a committed information rate;
dividing an actual size of the packet by a step size of the counter to determine a quotient and a remainder;
adding a random value to the quotient to provide a probabilistic size of the packet, wherein the random value is selected from a sample space {0, 1} and a probability of selecting the sample value '1' from the sample space is equal to the remainder divided by the step size of the counter;
marking the packet with a marker that indicates a level of conformance at or below the committed information rate based on the counter value being greater than one of the actual size of the packet or the probabilistic size of the packet; and
decrementing the counter by the probabilistic size of the packet.

19. The method of claim 18, wherein the actual size of the packet and the step size of the counter are given in terms of bytes.

20. The method of claim 18, further comprising:
adding a random number to the counter value before comparing the counter value to the one of the actual size of the packet or the probabilistic size of the packet.

* * * * *